United States Patent [19]

Fujimoto

[11] Patent Number: 4,667,435
[45] Date of Patent: May 26, 1987

[54] FISHHOOK HOLDER

[75] Inventor: Ichio Fujimoto, Hyogo, Japan

[73] Assignee: Fujic Fishing Tackle Mfg. Co., Ltd., Hyogo, Japan

[21] Appl. No.: 757,436

[22] Filed: Jul. 22, 1985

[51] Int. Cl.⁴ ............................................. A01K 83/00
[52] U.S. Cl. .................................... 43/43.16; 43/44.83
[58] Field of Search ................. 43/5, 6, 42.27, 43.1, 43/44.83, 43.16, 44.20, 44.83, 44.84, 44.87, 34, 44.4, 44.6, 44.8, 42.7; 294/26; 24/129 R, 129 B, 265 H, 265 R, 543, 563

[56] References Cited

U.S. PATENT DOCUMENTS

| 787,806 | 4/1905 | Torgerson | 43/42.7 |
|---|---|---|---|
| 859,144 | 7/1907 | Stanley | 43/43.2 |
| 1,333,101 | 3/1920 | Cooper | 24/129 R |
| 1,401,086 | 12/1921 | King | 43/44.83 |
| 2,385,274 | 9/1945 | Hammond | 43/44.2 |
| 2,917,860 | 12/1959 | Norton | 43/43.2 |
| 2,938,295 | 5/1960 | Watson | 43/43.2 |
| 3,047,975 | 8/1962 | Pretorius | 43/44.2 |
| 3,169,338 | 2/1965 | Morin | 43/43.6 |
| 3,293,790 | 12/1966 | Konomos | 43/44.2 |
| 3,430,378 | 3/1969 | Sweeney | 43/43.6 |

Primary Examiner—M. Jordan
Attorney, Agent, or Firm—Birch, Stewart, Kolasch & Birch

[57] ABSTRACT

A fishhook holder comprising a holding section which holds a root of the fishhook constituted by a melted-down part or an annular part and a gripping section between which a shank or a fishline knotting part of the fishhook is gripped. Providing the holding section of the fishhook holder with a hole, an insertional slit, or a fishline fastening part enables the fishline to be tied. Furthermore, natural raw bait and auxiliary natural raw bait can be also held to the hook to be provided in the gripping section, to which artificial bait or feathering is mounted, or by which it can be detachably supported. It is also possible that a hole for holding a paste bait is provided on the gripping section and a small net is mounted thereto. In addition, a tentacle for protecting the hook from an alga can be easily mounted thereto.

8 Claims, 33 Drawing Figures

FISHHOOK HOLDER

BACKGROUND OF THE INVENTION

The present invention relates to a new multipurpose fishhook holder which is mounted to the fishhook.

Conventionally, natural raw bait and auxiliary natural raw bait easily slip from fishhook, artificial bait needs separate hook, and fixtures are necessary for using paste bait and protecting the hook from alga, respectively.

It is known to tie the fishline to the fishhook. However a system is not available for use in which the fishline is mounted to the holder by itself. A bottleneck in mounting the fishhook to holder is that it is difficult to determine how to do so.

The purpose of the present invention, which is created in light of the foregoing situation, is to provide a multipurpose fishhook holder which prevents natural raw bait from slipping from the hook, can hold auxiliary natural raw bait, artificial bait, and paste bait, can be provided with a tentacle for protecting the hook from the alga, and the fishline being able to be attached thereto.

BRIEF SUMMARY OF THE INVENTION

The fishhook holder of the present invention is an integral device comprising a holding section and a gripping section. While the holding section is to hold the root of the fishhook, the gripping section grips the shank of the fishhook, etc. therebetween.

If the holding section is provided with a hole, such as an insertional slit, in the fishline fastening part, the fishline can be tied thereto. Providing of the hook on the gripping section enables natural raw bait and auxiliary natural raw bait to be held, the artificial bait and the feathering can be mounted to the gripping section or supported by it. Furthermore, it is possible to provide a hole for holding the paste bait and to mount the small net thereto, the tentacle for protecting the hook from the alga being also able to be mounted thereto.

BRIEF DESCRIPTION OF THE DRAWINGS

FIG. 1-(1) is a perspective view of the embodiment of the fishhook holder according to the present invention wherein the holding section possesses a grasping part;

FIG. 1-(2) is a plan view of a punched thin plate, before being fabricated, for the same embodiment;

FIG. 1-(3) is a perspective view of the state in which the holding section of the fishhook holder of FIG. 1-(1) is mounted to the melted-down part and the fishline knotting part is gripped between the gripping section.

FIG. 2-(1) is a perspective view of the other embodiment of the fishhook holder according to the present invention;

FIG. 2-(2) is a perspective view of the state in which the holding section of the fishhook holder of FIG. 2-(1) holds the annular part of the fishhook and the gripping section interposes the shank of the fishhook therebetween.

FIG. 6-(1) is a front view;

FIG. 6-(2) is a plan view;

FIG. 6-(3) is a bottom view; and

FIG. 6-(4) is a front view illustrating entirely the fishhook and the fishhook holder.

FIG. 8-(1) is a perspective view of the embodiment in which the hole to which the fishline is tied is provided on the top and of the holding section of the fishhook holder of FIG. 5;

FIG. 8-(2) is a perspective view of the state of using the same fishhook holder.

FIG. 9-(1) is a perspective view of the other embodiment in which the fishline attaching part comprising the insertional slit is provided on the top end of the holding section of the fishhook holder of FIG. 5;

FIG. 9-(2) is a perspective view of the state of using the fishhook holder of FIG. 9-(1).

FIG. 10-(1) is a perspective view of the other embodiment in which the fishline attaching part comprising the fishline knotting part if provided on the top end of the holding section of the fishhook holder of FIG. 5;

FIG. 10-(2) is a perspective view of the state of using the same embodiment.

FIG. 11-(1) is a perspective view of the arrangement in which the hook for holding the natural raw bait is gripped between the gripping section of the fishhook holder of FIG. 1-(1), FIG. 11-(2) is a perspective view of the state of holding the natural raw bait;

FIG. 11-(3) is a perspective view of the state of supporting the artificial bait.

FIG. 12-(1) is a perspective view of the arrangement in which the hook for holding the auxiliary natural raw bait is gripped between the gripping section of the fishhook holder of FIG. 5;

FIG. 12-(2) is a front view of the state of using the same.

FIG. 13-(1) is a perspective view of the arrangement in which the artificial bait is mounted to the gripping section of the fishhook holder of FIG. 8-(1);

FIG. 13-(2) is a perspective view of the state of using the same arrangement.

FIG. 14-(1) is a perspective view of the arrangement in which the feathering is mounted to the gripping section of the fishhook holder of FIG. 2-(1);

FIG. 14-(2) is a perspective view of the state of using the same arrangement.

FIG. 17-(1) is a perspective view of the arrangement in which the tentacle for protecting the hook from the alga is mounted to the gripping section of the fishhook holder of FIG. 5;

FIG. 17-(2) is a perspective view of the state of using the same arrangement.

DETAILED DESCRIPTION OF THE PREFERRED EMBODIMENT

A description of the preferred embodiment is made in conjunction with the accompanying drawings as follows:

FIGS. 1 and 2 illustrate an embodiment of the fishhook holder in which, in order to hold the root of the fishhook, the holding section is partially folded inward, thereby forming the grasping part, FIGS. 3 to 7 illustrate another embodiment of the fishhook holder in which, in order to hold the root of the fishhook, an insertional slit is provided on the holding section thereof, and FIGS. 8 to 10 also illustrate another embodiment of the fishhook holder in which a fishline attaching part is provided on the top end of the holding section.

In the drawings (1) is the shank of the fishhook, (2) is a melted-down part, (3) is the annular part of the fishhook, and (4) is the point thereof.

Figure 11:
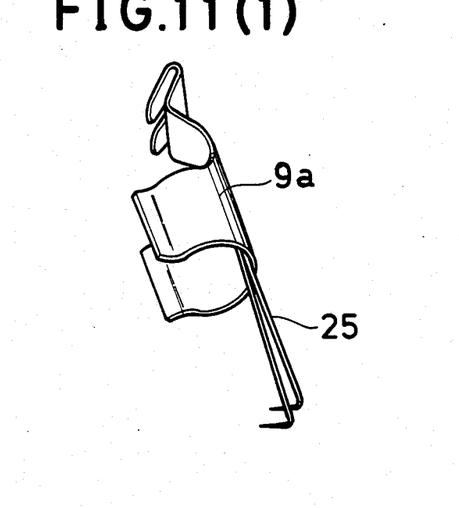

Referring to FIG. 1, (5a) is the grasping part of the fishhook holder (40), which is made by means of folding the upper end of the holding section (6a) in an inward and lower direction and can grasp an enlarged part, such as the melted-down part (2) or the annular part (3) of the fishhook. (9a) is the gripping section, which has the fishhook holder (40) mounted to the shank (1) or the fishline knotting part (7) of the fishhook, thereby gripping the fishhook therebetween. Therefore, the fishhook holder (40) is integrally formed to comprise the holding section (6a) having the grasping part (5a) and the gripping section (9a).

Figure 12:
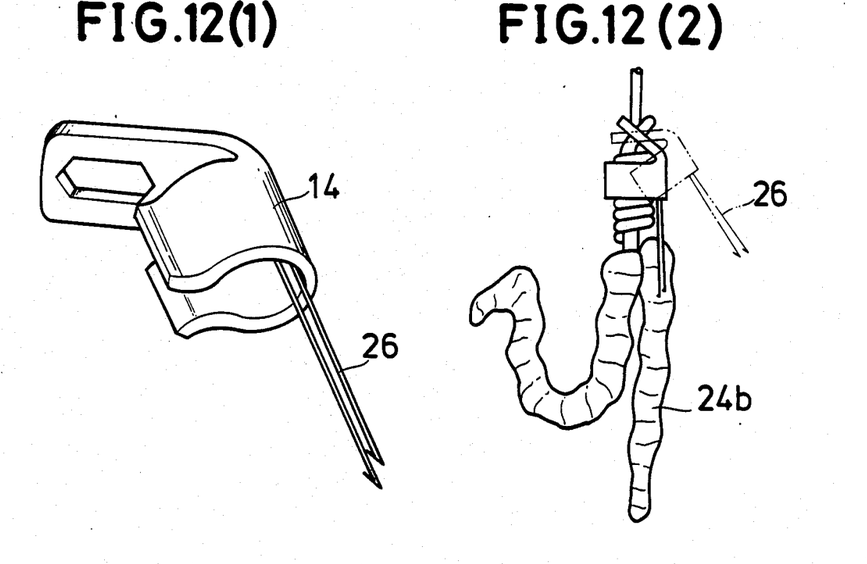

While the fishhook holder (40) is made by casting, it can be also made of sheeting such as a punched thin plate (10) as shown in FIG. 1-(2).

In FIG. 2, (5b) is the grasping part of the fishhook holder (41), which is made by means of folding both the upper sides of the holding section (6b) in an inward direction and can grasp the melted-down part (2) or the annular part (3) of the fishhook. (9b) is the gripping section of the fishhook holer (41), which performs the identical function similarly to (9a).

Figure 13:
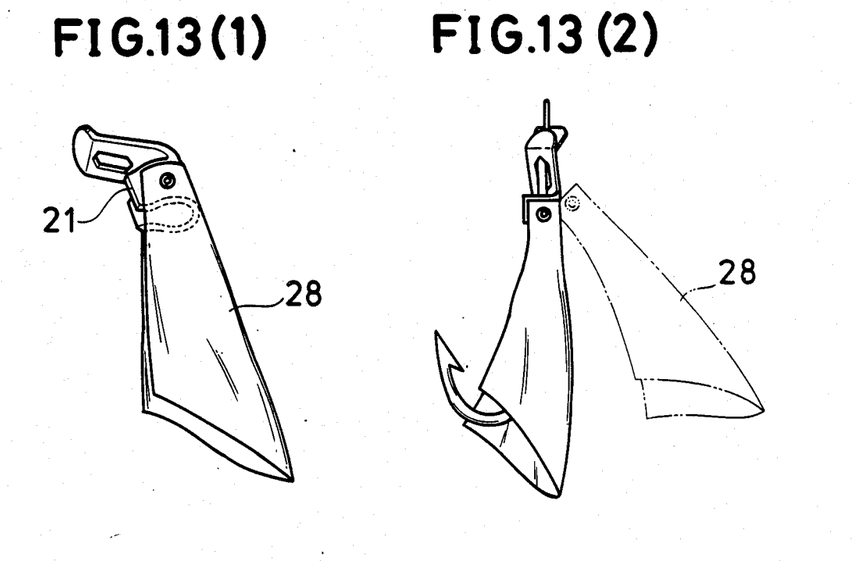

The fishhook holder (40) grasps the upper side of the melted-down part (2) by means of the grasping section (5a) provided on the holding section (6a) and, subsequently, the gripping section (9a) is mounted to the fishline knotting part (7) of the fishhook, thereby gripping said fishline knotting part (7) therebetween. On the other hand, the fishhook holder (41) grasps the annular part (3) in such a way that its sides are held under the grasping part (5b) provided on the holding section (6b), and, subsequently, the gripping section (9b) is mounted to the shank (1) of the fishhook, thereby gripping said shank (1) therebetween.

Figure 1:
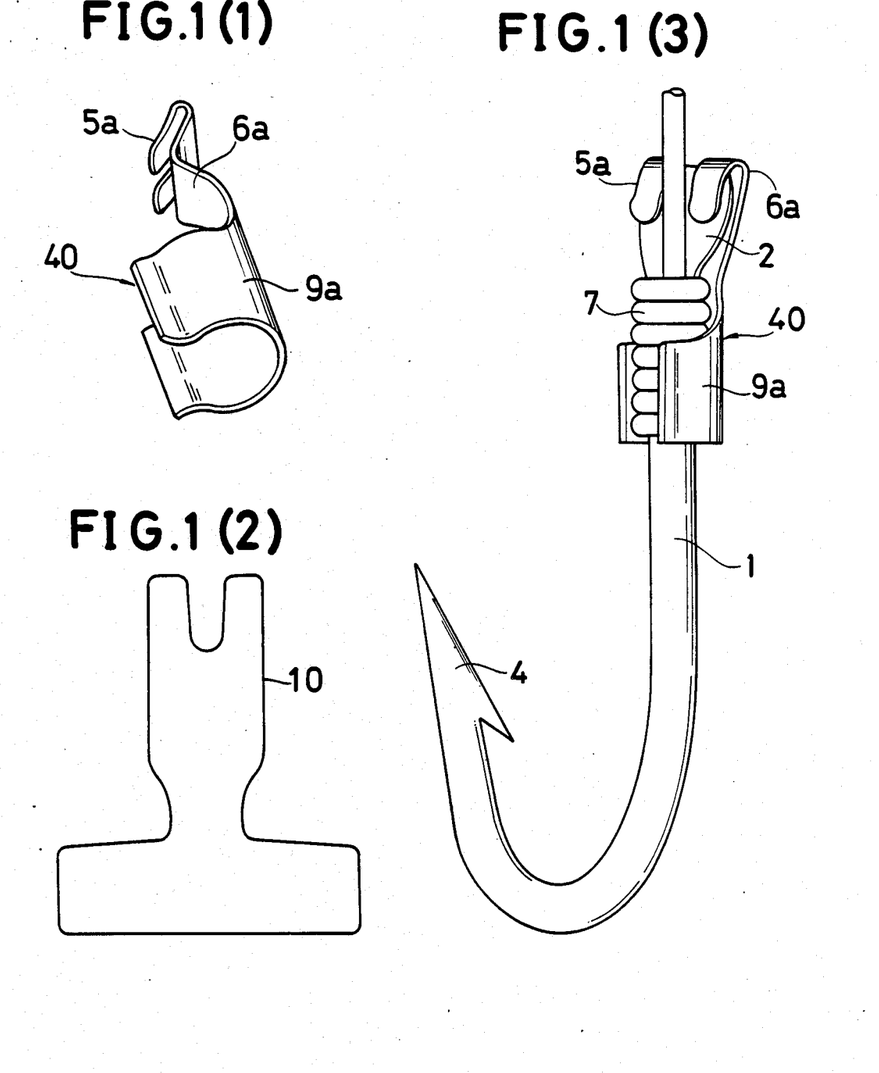
Figure 2:
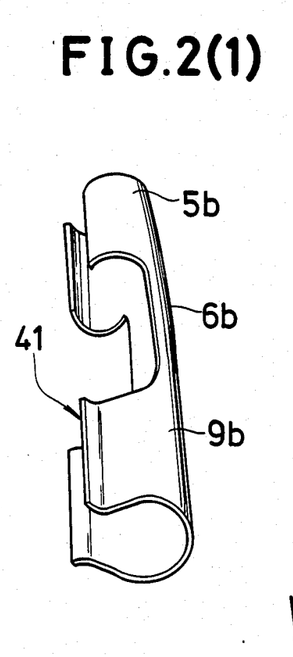
Figures 3, 4:
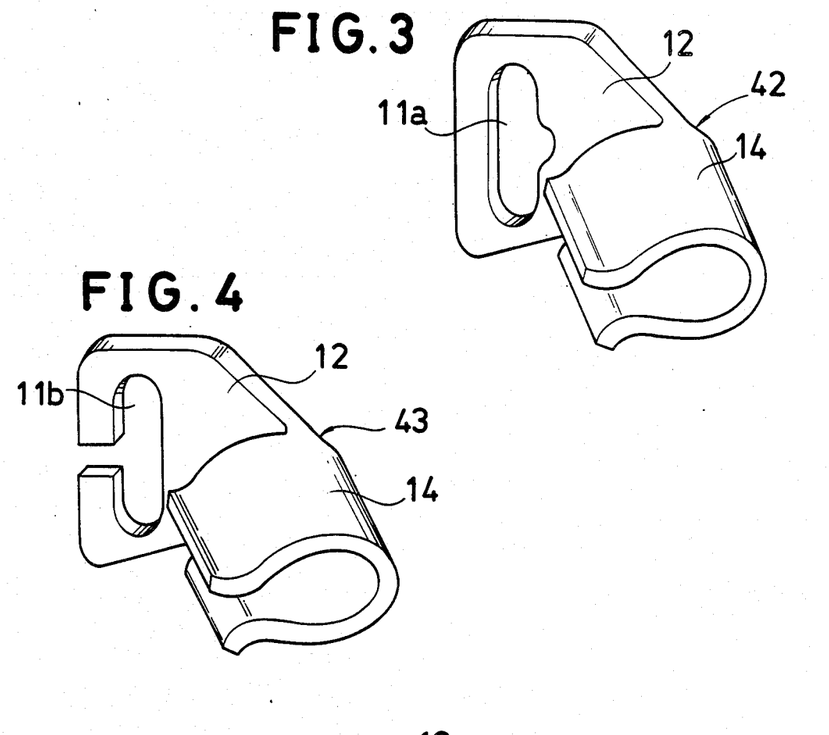
FIG. 3 is a perspective view of the fishhook holder having the isertional hole, which is privided on the holding section thereof according to the present invention, formed into a long sideways oval shape.
FIG. 4 is a perspective view of the fishhook holder having the insertional hole, which is provided on the holding section thereof according to the present invention, formed into a T-shape.
Figure 5:
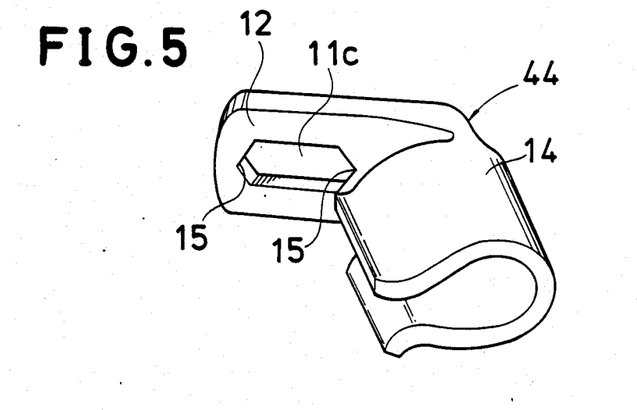
FIG. 5 is a perspective view of the fishhook holder having the insertional hole, which is provided on the holding section thereof according to the present invention, formed into a longitudinally long hexagonal shape.

Referring to FIGS. 3 to 7, which illustrate another embodiment, (11a) is the insertional slit, provided on the holding section (12), into which the shank (1) or the annular part (3') is inserted so that each of them may be supported, and which possesses a sideways oval shape. (14) is the gripping section, to which the above-mentioned description of the last embodiment may be applicable. FIG. 4 illustrates a fishhook holder (43) possessing a T-shaped insertional slit (11b). Such a fishhook holder (44) as shown in FIG. 5 has the insertional slit (11c) possessing a longitudinally extended and regular hexagonal shape.

Figure 6:
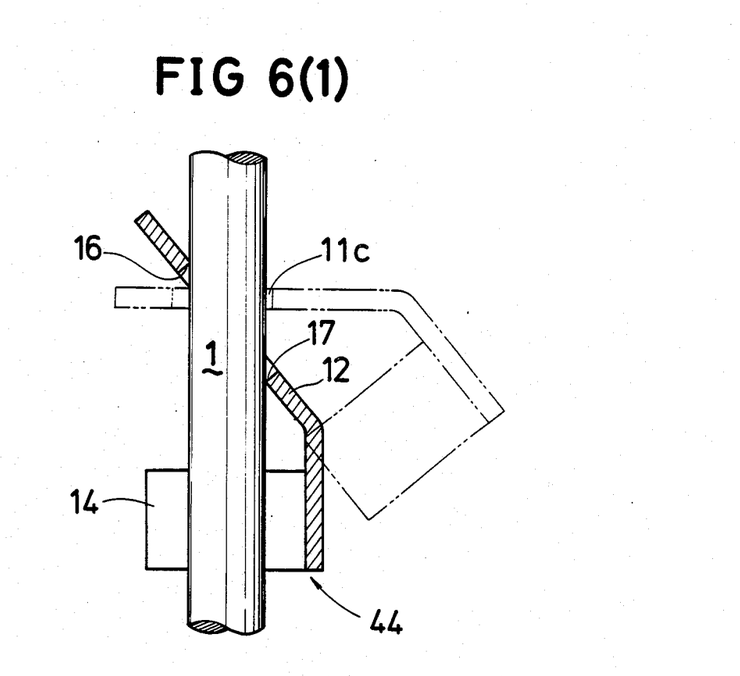
FIG. 6 illustrates the state in which the fishhook holder of FIG. 5 is mounted to the shank of the fishhook.

FIG. 6 illustrates the fishhook holder (44) of FIG. 5 mounted to the shank (1), so that the fishhook holder (44) is firmly fixed thereto by the upper supporting points (A) and (B) and the lower supporting points (C) and (D) near the tops (15) and (15) of the longitudinally extended and hexagonal insertional slit (11c). FIG. 6-(4) is a general view of the arrangement in which the fishhook holder (44) is fixed to the shank (1).

Figures 6, 7:
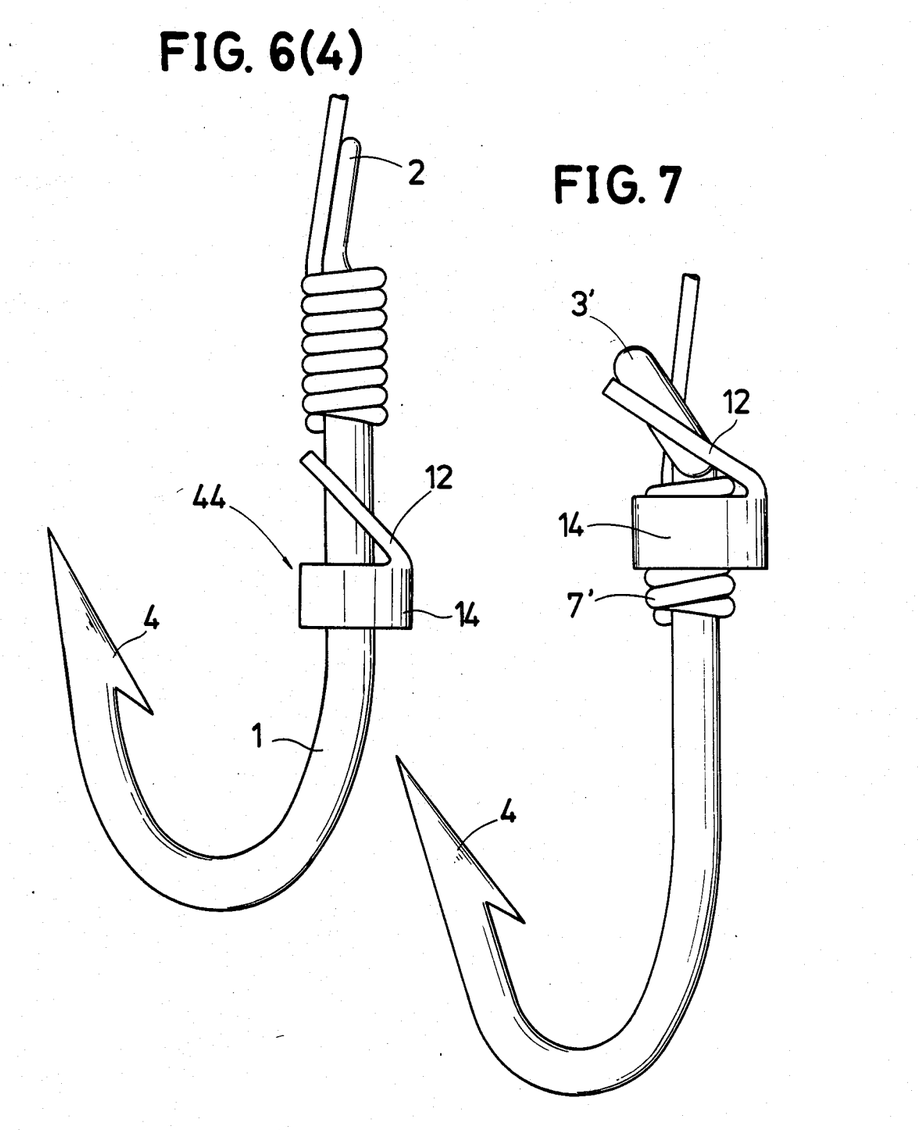
FIG. 7 is a perspective view of the state in which the holding section of the fishhook holder according to the present invention holds the annular part of the fishhook and the gripping section thereof grips the fishline knotting part of the fishhook therebetween.
Figure 8:
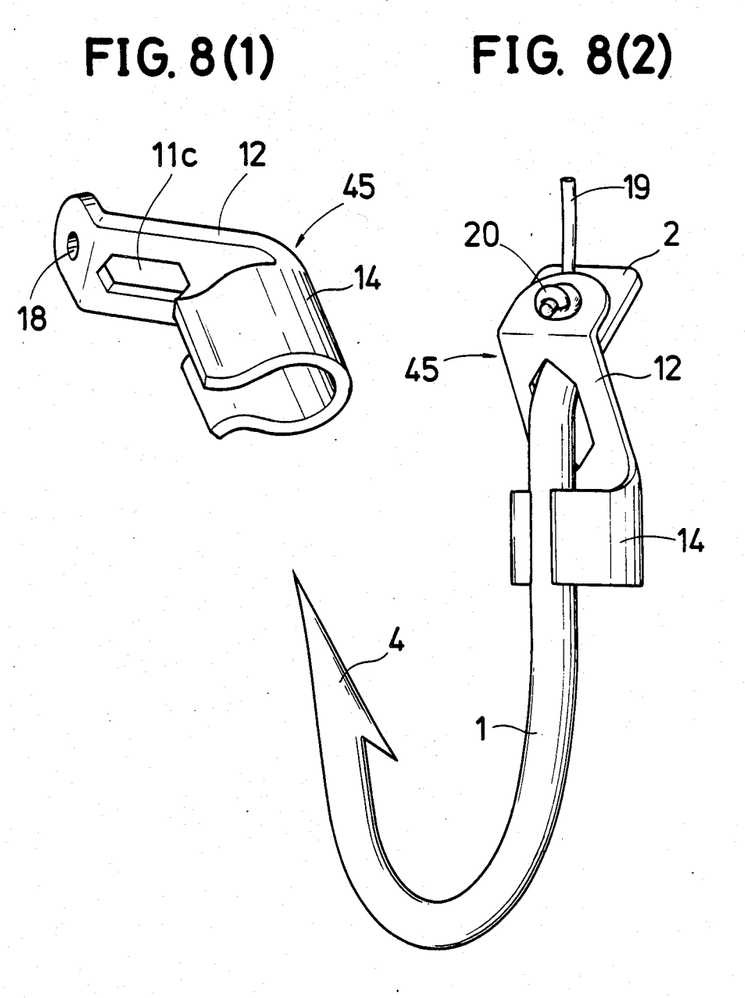
Figure 9:
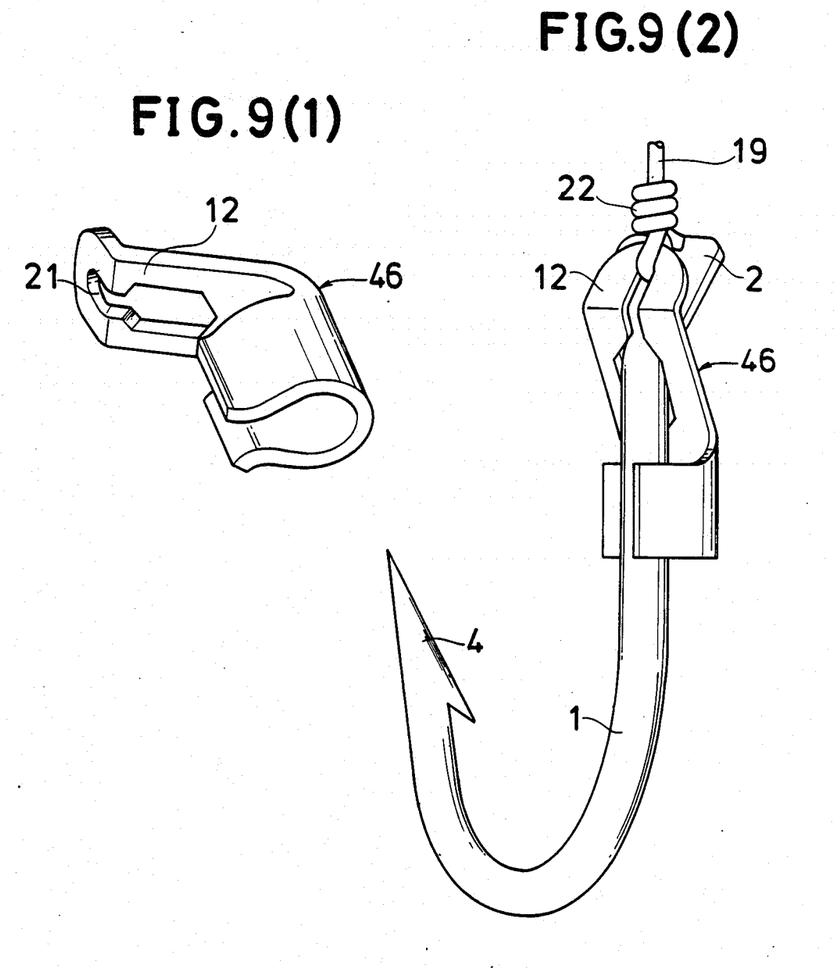
Figure 10:
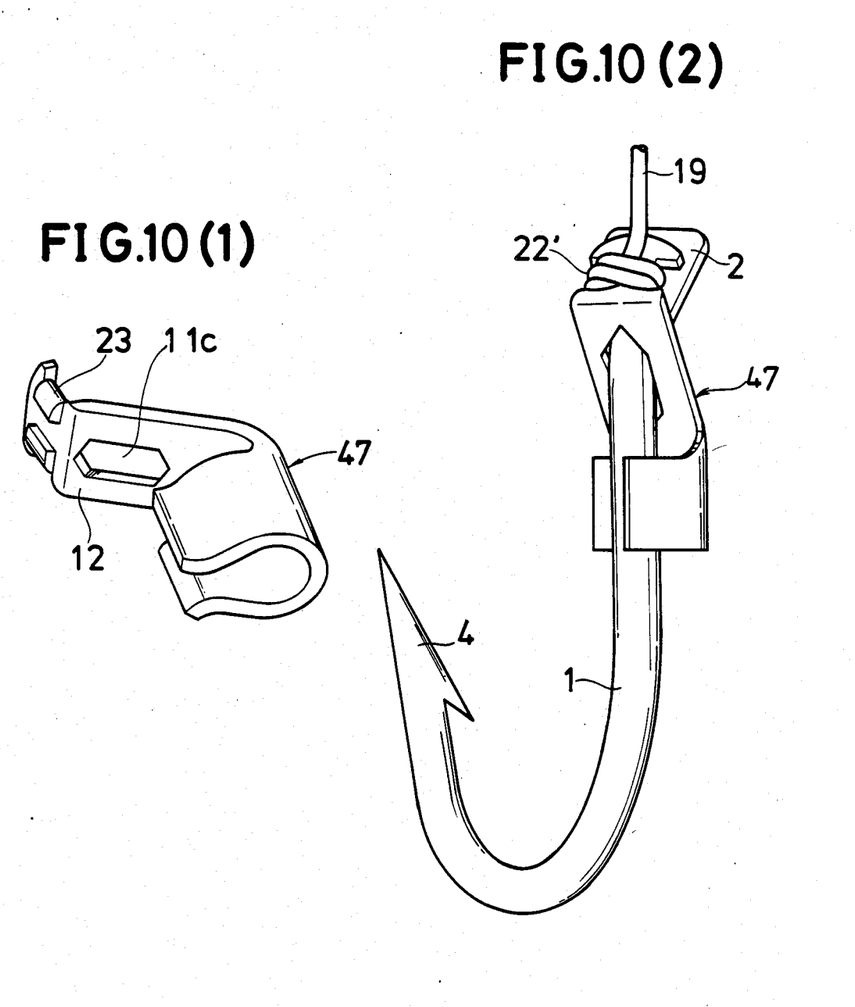

FIG. 7-(1) illustrates the state in which the holding section (12) and the gripping section (14) are fixed to the annular part (3') and the fishline knotting part (7'), respectively of the fishhook.

FIG. 8-(1) illustrates a fishhook holder (45) which is made by having the top end of the holding section (12) of fishhook holder (44) as shown in FIG. 5 slightly extended and a hole (18) is made on the resultant extended part, which has been folded outward in advance. As shown in FIG. 8-(2), it is possible to tie the fishline (19) to said hole (18). (20) is a knot of the fishline (19), and, because the fishline (19) is fastened by the melted-down part (2) of the fishhook, the fishline (19) does not come loose. As a result, there is no necessity of tying the fishline to the fishhook.

Such fishhook holders (46) and (47) as shown in FIGS. 9 and (10), capable of tying the fishline (19) to the holder by itself similarly to the foregoing case, reduce the necessity of tying the fishline to the fishhook to nil.

FIG. 9-(1) illustrates the fishhook holder (46) which extends the upper end of the holding section (12), folds the same outward, and provides the insertional hold slit (21) on the upper part of the insertional hole. As shown in FIG. 9-(2), the fishline (19) is mounted to said insertional hole slit (21).

FIG. 10-(1) illustrates the fishhook holder (47) which extends the upper end of the holding section (12), folds the same outward, and provides fishline fastening part (23) on the resultant extended part. As shown in FIG. 10-(2), the fishline (19) is attached to said fishline fastening part (23).

Next, FIGS. 11 to 18 illustrate examples of mounting various kinds of attachment to the gripping section of the fishhook holder.

FIGS. 11-(1) and 11-(2) illustrate a fishhook holder which provides hook (25) for holding natural raw bait (24a) on the gripping section (9a) and FIGS. 12-(1) and 12-(2) illustrate a fishhook holder which provides hook (26) for holding auxiliary natural raw bait (24b) on the gripping section (14). In the former case, the point of the hook (25) is folded. FIG. 11-(3) illustrates a fishhook holder in which artificial bait (27) is supported by the hook (25), FIGS. 13-(1) and 13-(2) illustrate the arrangement in which artificial bait (28) is mounted to the gripping section (21), and FIGS. 14-(1) and 14-(2) illustrate the arrangement in which feathering (29) is mounted to the gripping section (9b).

Figures 14, 15, 16:
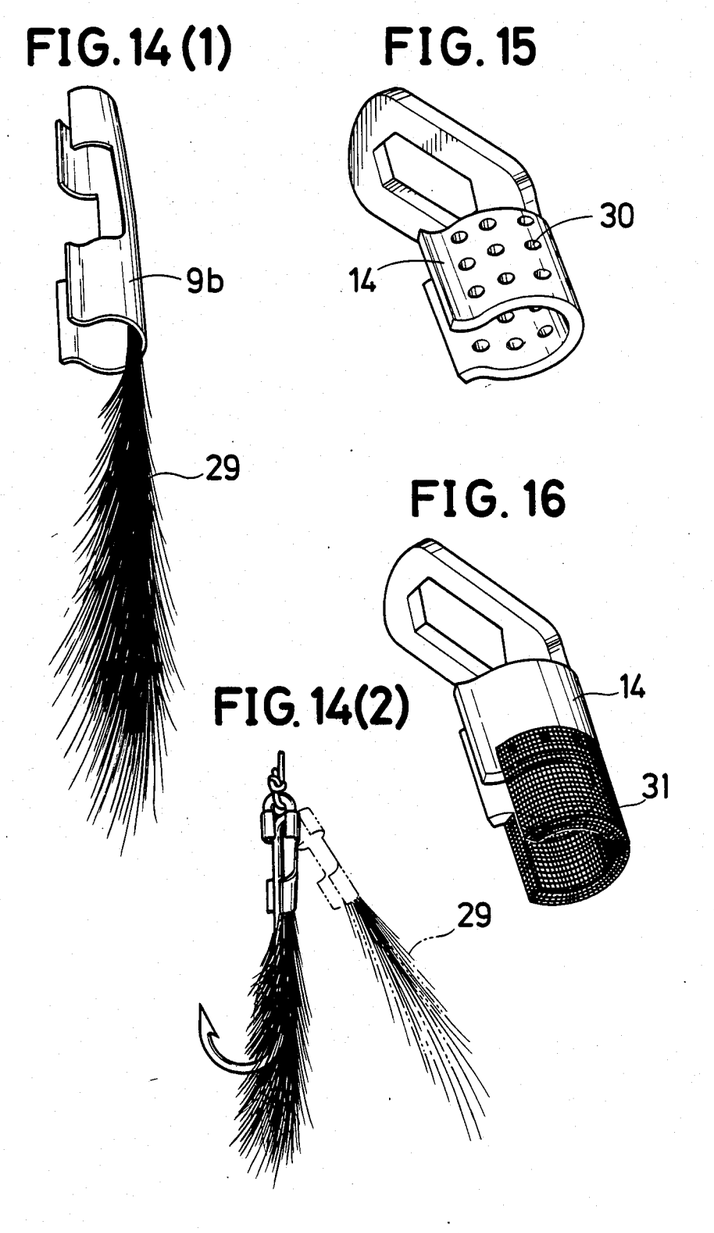
FIG. 15 is a perspective view of the arrangement in which holes for holding the paste bait are provided on the gripping section of the fishhook holder of FIG. 5.
FIG. 16 is a perspective view of the arrangement in which the small net for holding the paste bait is mounted to the gripping section of the fishhook holder of FIG. 5.

FIG. 15 illustrates the arrangement in which holes (30) for holding the paste bait are provided on the gripping section (14) of the fishhook holder and FIG. 16 illustrates the arrangement in which a small net (31) for holding the paste bait is provided on the gripping section (14). In that case, scented agent for catching fish can be sealed to be contained in small net (31).

Figures 17, 18:
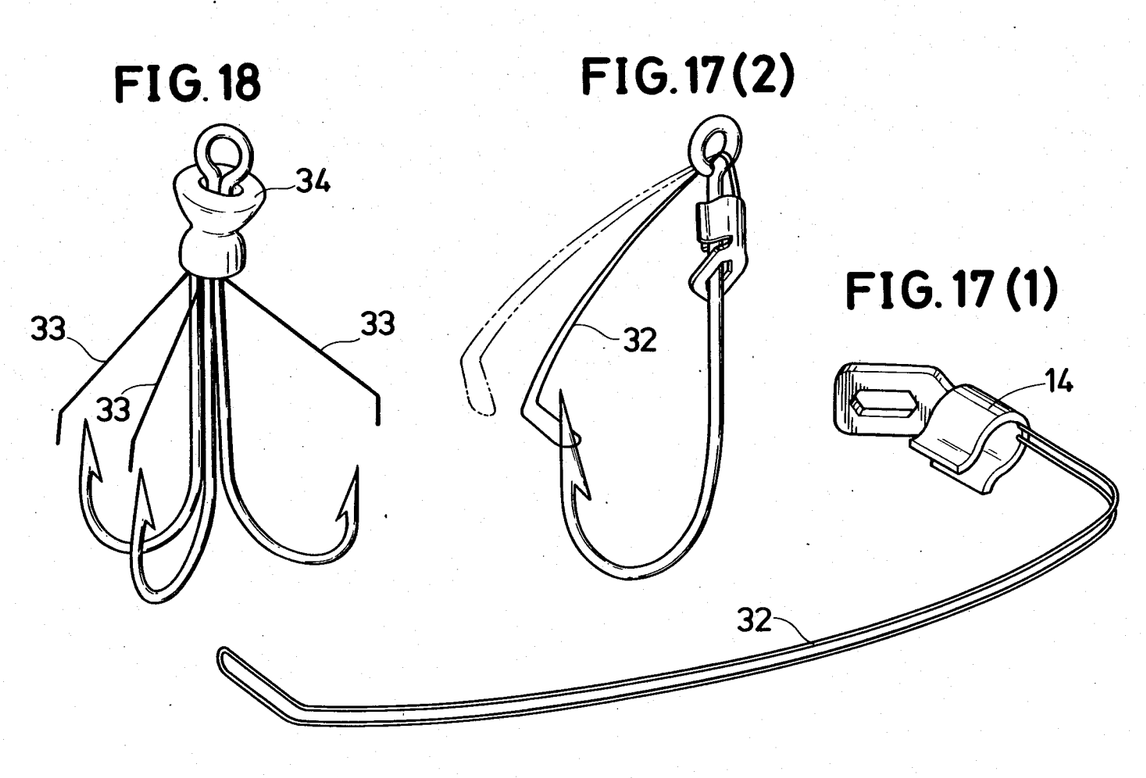
FIG. 18 is a perspective view of the arrangement in which the fishhook holder equipped with the triple tentacle for protecting the hook from the alga is used in the triangle hook.

Finally, FIGS. 17-(1) and 17-(2) illustrates the arrangement in which a metallic-wire-made tentacle (32) for protecting the hook from alga is mounted on the gripping section (14) of the fishhook holder, and FIG. 18 illustrates the arrangement in which the tentacles (33), (33), and (33) for protecting the hook from the alga are mounted on the gripping section of the fishhook holder, they are subsequently fixed to the triangle hook, and said fishhook holder is covered with a holder cover (34).

It is apparent from the foregoing description that the fishhook holder according to the present invention makes it possible to mount the hook for holding natural raw bait, artificial bait, feathering, the hole and the small net for holding paste bait, or an attachment such as the tentacle for protecting the hook from the alga.

Fixing only of the gripping section of the holder is not sufficient in order to mount the foregoing parts and attachment, and further providing of the holding section to said holder in an integral manner extemely reinforces the fixing of said holder to the fishhook, thereby holding the above-mentioned parts and attachment. Therefore, the fishhook holder according to the present invention enables the foregoing effect to be produced by means of the fixing by both the holding section and gripping section.

In addition to that the fishhook holder according to the present invention can have the fishline attached directly thereto, whereby there is no necessity of knotting the fishline to the fishhook and a replacement of the fishhook for a different one can be easily executed.

In conclusion, the fishhook holder according to the present invention can be used in a multipurpose, producing markedly useful effects.

What is claimed is:

1. A fishhook holder comprising a holding section which holds a root of a fishhook constituted by an enlarged part, and a gripping section which grips a shank of the fishhook therebetween,
    said holding section includes an insertional hole through which a part of the fishhook is inserted in order to be supported, and
    a slit is provided from said insertional hole in said holding section in a direction toward the top end of said holding section, the fishline being able to be tied to said slit.

2. A fishhook holder comprising a holding section providing means for supporting a fishhook and which holds a root of a fishhook constituted by an enlarged part, a gripping section which grips a shank of the fishhook therebetween, said supporting means includes an insertional hole in said holding section through which a part of the fishhook is inserted in order to be supported, and said insertional hole providing means for receiving the fishhook shank at an oblique angle to the plane of said insertional hole.

3. A fishhook holder as defined in claim 2, wherein said insertional hole in said holding section takes an oval shape which is longitudinally longer in a vertical direction.

4. A fishhook holder as defined in claim 2 wherein said insertional hole in said holding section takes a hexagonal shape which is longitudinally longer in a vertical direction.

5. A fishhook holder as defined in claim 2, wherein said insertional hole in said holding section takes an oval shape which is sideways longer in a horizontal direction.

6. A fishhook holder as defined in claim 2, wherein said insertional hole in said holding section takes a T-shape.

7. A fishhook holder comprising a holding section which holds a root of a fishhook constituted by an enlarged part and a gripping section which grips a shank of the fishhook therebetween,
    said holding section includes an insertional hole through which a part of the fishhook is inserted in order to be supported, said insertional hole providing means for receiving the fishhook shank at an oblique angle to the plane of said insertional hole, and
    a fishline fastening part is provided on the top end of said holding section.

8. A fishhook holding comprising a holder section which holds a root of a fishhook constituted by an enlarged part and a gripping section which grips a shank of the fishhook therebetween,
    said holding section includes an insertional hole through which a part of the fishhook is inserted in order to be supported, said insertional hole providing means for receiving the fishhook shank at an oblique angle to the plane of said insertional hole, and
    said holding section on the top end thereof is provided with a hole to which the fishline is tied.

* * * * *